Jan. 20. 1925.  1,523,843
W. A. SMITH
MACHINE FOR PREPARING FOOD COMPOUNDS
Filed Jan. 28, 1921    4 Sheets-Sheet 1

INVENTOR.
William A. Smith.
BY Fredrick F. Church
his ATTORNEY.

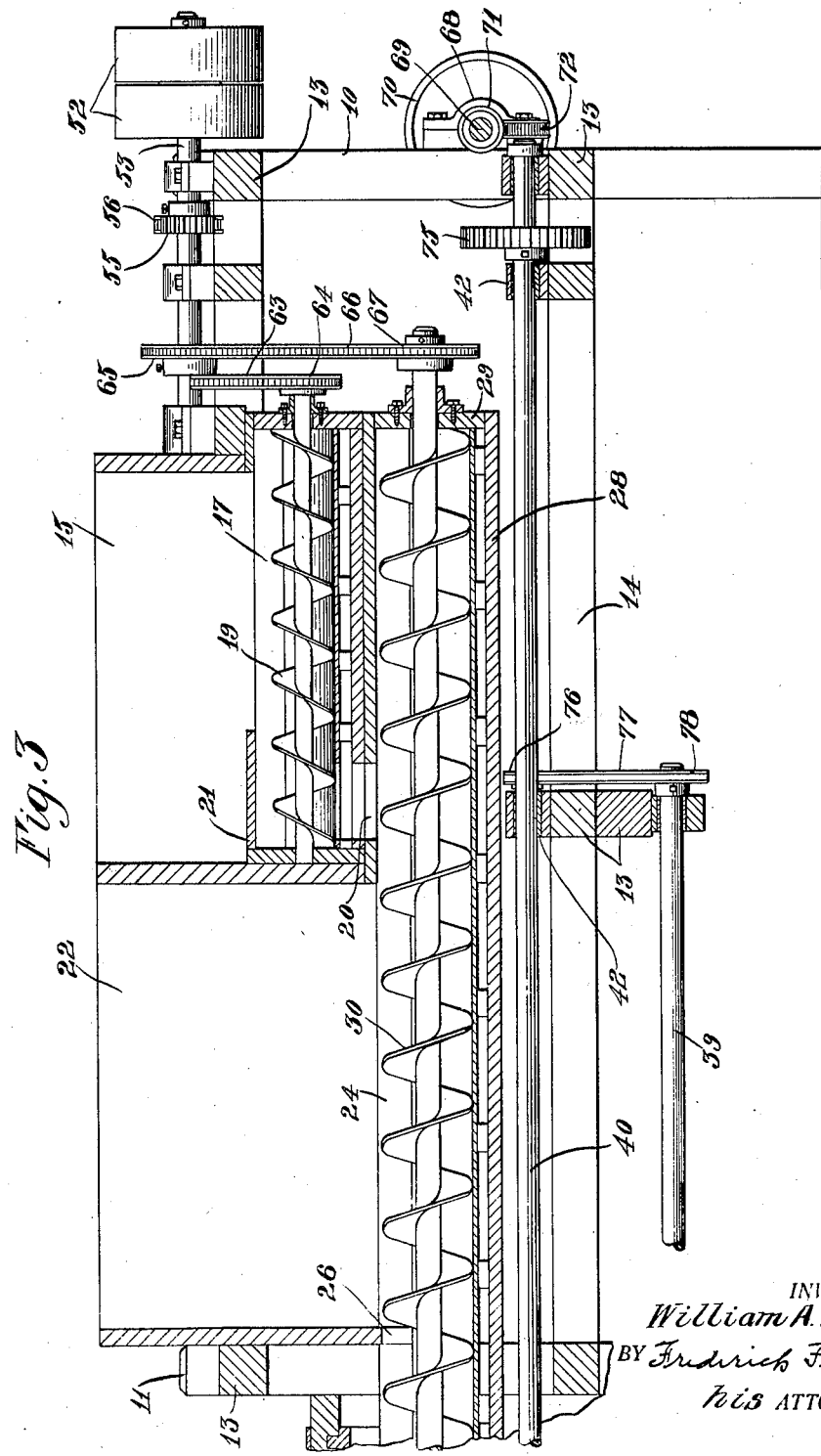

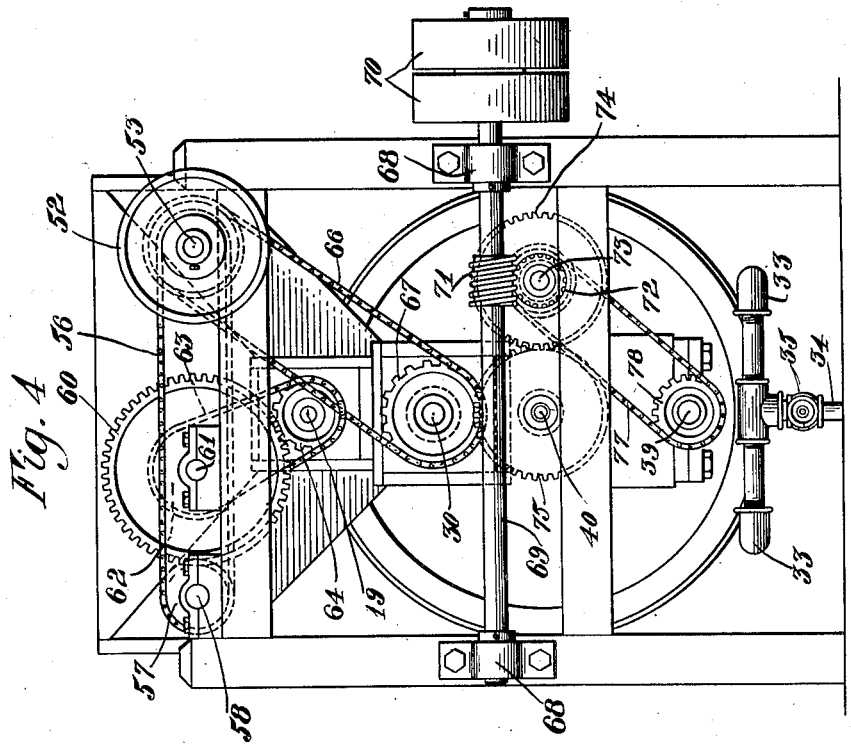

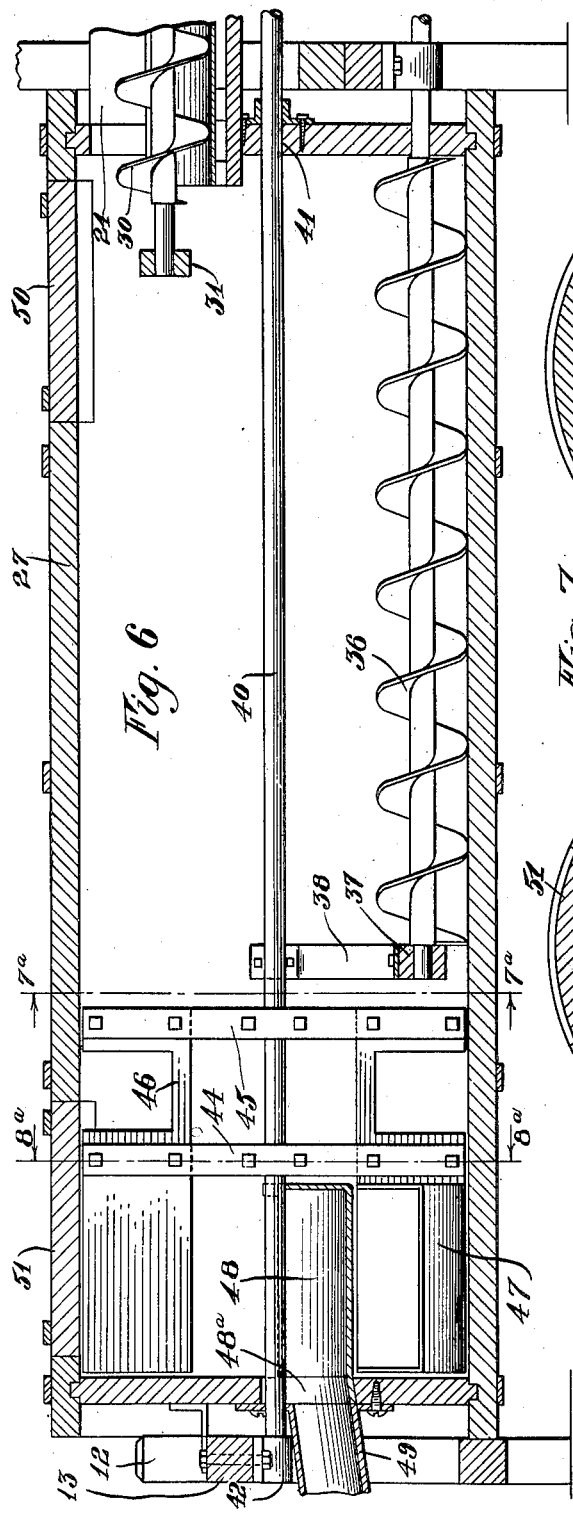
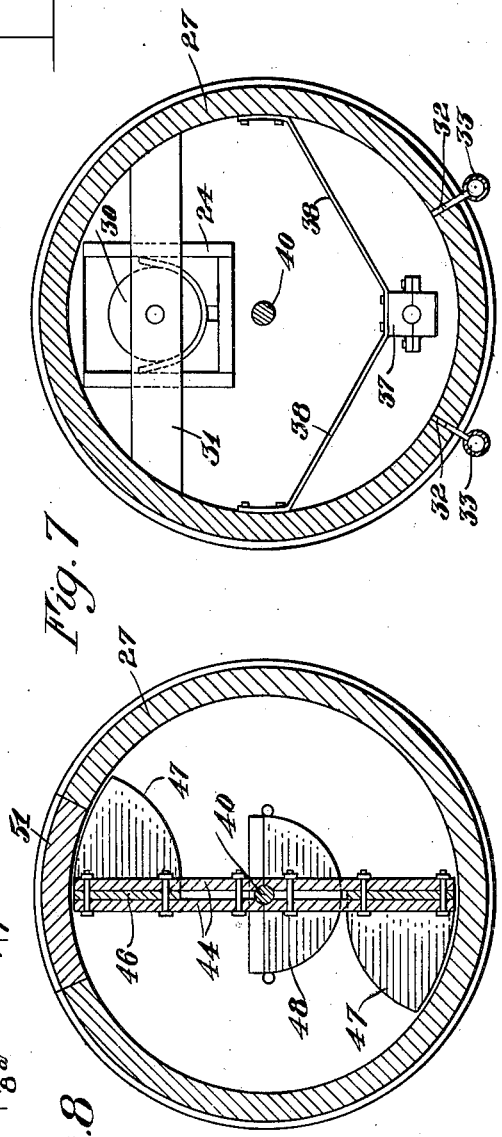
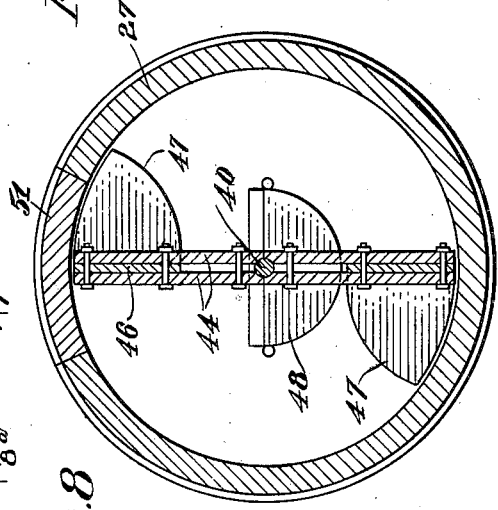

Patented Jan. 20, 1925.

1,523,843

UNITED STATES PATENT OFFICE.

WILLIAM A. SMITH, OF CLARKSON, NEW YORK.

MACHINE FOR PREPARING FOOD COMPOUNDS.

Application filed January 28, 1921. Serial No. 440,799.

*To all whom it may concern:*

Be it known that I, WILLIAM A. SMITH, of Clarkson, in the county of Monroe and State of New York, have invented certain new and useful Improvements in Machines for Preparing Food Compounds; and I do hereby declare the following to be a full, clear, and exact description of the same, reference being had to the accompanying drawings, forming a part of this specification, and to the reference numerals marked thereon.

This invention has to do with machines for preparing food compounds and relates more particularly to machines adapted to measure a plurality of ingredients in proper relative proportions and mix and cook the same to prepare a desired compound, one object of the invention being to provide a simple, practical and efficient machine of the above character adapted to produce a compound such, for example, as fruit sauce. Another object is to provide a machine of this type operating automatically and rapidly by a continuous and economical form of process to produce a sanitary compound of uniformly desirable quality. To these and other ends the invention consists in certain improvements and combinations of parts, all as will be hereinafter more fully described, the novel features being pointed out in the claims at the end of the specification.

In the drawings:

Figure 1 is a side elevation of a machine embodying the present invention.

Figure 2 is a top plan view of the same partly broken away.

Figure 3 is an enlarged sectional elevation of a portion of the machine on the line 3ª—3ª of Figure 2.

Figure 4 is an end elevation as seen from the right in Figure 1.

Figure 5 is a sectional elevation on the line 5ª—5ª of Figure 2.

Figure 6 is a central, longitudinal elevation similar to Figure 3 but showing the other half of the machine.

Figures 7 and 8 are sections on the lines 7ª—7ª and 8ª—8ª respectively, of Figure 6.

Similar reference characters throughout the several views indicate the same parts.

The embodiment of the invention selected for disclosure herein is intended merely by way of illustration of the principles involved and a preferred practical application of the same, and is, of course, susceptible of various modifications in the construction and mode of operation falling within the spirit of the invention. This embodiment, which is in the nature of an improvement of the apparatus disclosed in my copending application for machines for and methods of preparing food substances, Serial No. 425,091 filed November 19, 1920, comprises preferably a plurality of ingredient receptacles and a heating or cooking chamber, provided with means for automatically effecting a continuous flow of the ingredients from the respective receptacles to and through the cooking chamber, at such a predetermined rate of flow for each and in such a manner as to measure the ingredients according to their desired relative proportions and thoroughly mix the same, together with means for cooking the mixture by an accurately controlled process and finally delivering the compound from the machine ready for screening, packaging or other disposition.

Referring to the drawings, and first to Figures 1 and 2, there is shown a supporting framework having spaced pairs of uprights 10, 11 and 12, with the uprights of each pair spaced and connected by cross members 13. The pairs of uprights, 10, 11 and 12 are likewise connected by longitudinal members 14, thus providing a rigid and substantial frame on which is supported adjacent the right hand end of the machine, Figures 3 and 5, a receptacle, or hopper, 15, for one of the compound ingredients, as for example, the sugar required in the production of sauce made from fruit, such as apples. The ends of the receptacle 15 are preferably vertical and the sides 16 are inclined inwardly and downwardly, terminating in a trough or channel 17 having a substantially semi-cylindrical bottom formed by a plate 18 of metal or other suitable material. Closely fitting the bottom 18 of the trough is a propelling means, in the present instance in the form of a screw propeller 19, adapted to be rotated by means presently to be described, for withdrawing and discharging suitable quantities of the ingredient from receptacle 15 through an outlet opening 20 in the bottom of the channel. A cover plate 21 is preferably provided above the propeller over outlet 20 to prevent the ingredient from falling directly through the latter, and insure feeding thereof under control of the propeller.

Supported on the frame adjacent receptacle 15 and preferably on the side of the latter inwardly of the machine, is a receptacle 22 for another ingredient, such, for example, as the fruit, or apples, which are preferably cut or sliced into pieces before being placed therein so as to expose a considerable surface of freshly cut pulp. Receptacle 22 is formed with vertical ends and with inwardly and downwardly inclined sides 23 terminating in a trough or channel 24 having a substantially semi-cylindrical bottom formed by a plate 25 of metal or other suitable material, this channel communicating with an outlet opening 26 adjacent the bottom of the receptacle and being extended therethrough so as to discharge through an opening in the end of a cylindrical cooking chamber 27 presently to be described.

Channel 24 has an extended portion 28 at its opposite end projecting exteriorly of the receptacle 22 and preferably below the outlet opening of receptacle 15, the channel having an opening registering with the outlet opening 20 of the latter. Rotatably supported in a bearing in the closed outer end 29 of the channel is a propelling means, or screw propeller 30, rotatably supported at its outer end in a bearing on a cross member 31 within the cooking chamber 27, and rotated by means presently to be described.

The cooking chamber 27 is preferably stationarily supported on the frame and of a substantially cylindrical shape with a slight inclination toward the left hand end of the machine to assist the flow of the contents. As already stated, the chamber is arranged to receive at its right hand end the ingredients discharged from channel 24 and is provided with heating means for cooking the mixed ingredients. Such heating means comprises preferably a plurality of small openings 32 arranged in parallel spaced rows extending longitudinally of the chamber adjacent and on either side of the central line of its bottom. Communicating with these openings are jet pipes carried by steam supply lines 33 connected with a main supply pipe 34 controlled by a throttle valve 35, by which means there are projected into the mixture in the chamber a series of jets of steam which are readily controlled in force and volume by the pressure regulating valve 35.

Chamber 27 is also provided with means for propelling the mixture slowly therethrough past the steam jets, comprising preferably a screw propeller 36 arranged adjacent the central line of the bottom of the chamber between the rows of steam jets, the latter tending to direct the mixture toward the propeller. The latter is rotatably supported at its left hand end in a bearing 37 carried by straps 38 fixed to the walls of the chamber, and has at its other end, extending exteriorly of the chamber toward the right hand end of the machine and supported in suitable bearings, a shaft portion 39 driven by means presently to be described.

Chamber 27 is also provided with means for working or beating the cooked compound and for delivering the same therefrom comprising a shaft 40 concentric with the chamber and rotating in a bearing 41 in the right hand end thereof and in bearings 42 on the cross members 13, the shaft being extended toward the right hand end of the machine where it is driven by suitable means presently to be described. Clamped on shaft 40 adjacent the end of propeller 36 are spaced pairs of arms 44 between the outer ends of which are bolted plates or boards 46 partially cut away and serving to work or beat the cooked compound. Boards 46 are extended toward the left adjacent the end of chamber 27 where they are provided with buckets or scoops 47 arranged to scoop up the compound and elevate and discharge the same into a trough 48 communicating with an opening 48$^a$ in the end of the chamber and with a delivering trough fixed exteriorly on the latter. By this means the cooked compound is discharged from the machine for delivery to a screening apparatus or such other disposition as may be desired. At the top of chamber 27 adjacent its ends are doors 50 and 51 affording convenient access thereto for inspection or cleaning.

The means for actuating the various moving parts of the machine comprises preferably tight and loose pulleys 52 carried at its right hand end on a short shaft 53 rotating in bearings 54 on cross members 13. The shaft has fixed thereon a sprocket 55 with which engages a chain 56 engaging at its other end a sprocket 57 fixed on a short shaft 58 rotating in bearings on cross members 13. Fixed on shaft 58 is a pinion 59 meshing with a gear 60 fixed on a short shaft 61 rotating in bearings on the cross members and having fixed thereon a sprocket 62 driving a chain 63 engaging a sprocket 64 upon the end of the shaft portion of the propeller 19 of receptacle 15 to rotate the same.

The propeller 30 of receptacle 22 is rotated by means comprising a sprocket 65 fixed on shaft 53 and driving a chain 66 engaging a sprocket 67 on the end of the shaft of the propeller. By these means propellers 19 and 30 are driven by independent connections with the power shaft 53 and it is apparent that after the selection of propellers of generally suitable dimensions in the first instance, they may be driven at practically any desired relative speeds for feeding ingredients in any desired relative proportions by the selection of gears or sprockets such as described of suitable sizes.

The means for rotating shaft 40 which actuates the beaters and delivery means of chamber 27 and the shaft 39 of the propelling means for the chamber is in the present instance independent of the actuating means for the propellers 19 and 30, as the former are driven at a comparatively slow speed. This result might of course be obtained by a gearing connection with the pulleys 52 but it is preferred at present to provide bearings 68 on the standards 10 in which rotates a shaft 69 carrying independent tight and loose pulleys 70 for driving the same. Fixed on shaft 69 is a worm 71 driving a worm gear 72 fixed on a shaft 73 rotating in bearings on two of the cross members 13. Shaft 73 has fixed thereon a gear 74 meshing with a gear 75 fixed on the end of shaft 40 of the bearing and delivery means of the cooking chamber. Fixed on shaft 73 also is a sprocket 76 driving a chain 77 meshing with a sprocket 78 fixed on the end of shaft 39 of the propeller 36 of the cooking chamber.

The operation of the machine is indicated by the above description of its construction, and it is apparent that when pulleys 52 and 70 are belted to a source of power the propellers 19 and 30 are rotated at suitable speeds for discharging the contents of the respective receptacles 15 and 22 in suitable relative proportions, whereby the latter are automatically measured to produce the desired constituency and flavor in the product. The ingredient of receptacle 15, such for example as sugar, is thus supplied to propeller 30 of receptacle 22 and moved by this propeller through the bottom of the receptacle where the fruit ingredient is picked up by the propeller and advanced to the discharge outlet. During this movement of the fruit ingredient the pieces or particles of the latter are thoroughly rolled around in the sugar, so that the particles of pulp are intimately mixed and thoroughly coated with the sugar to facilitate rapid and thorough cooking action in chamber 27. The latter thus receives the ingredients in a thoroughly mixed condition and propeller 36 advances the mixture along the inclined bottom of the cooking chamber and over the jets of steam rising through the bottom of the latter. The steam jets heat the mixture and direct it toward the propeller by which it is gently worked and moved along the chamber and into the path of adjacent steam jets, so that the compound is subjected in all its parts to a uniform penetration of heat and thus thoroughly cooked. The degree of heat may be accurately controlled by adjustment of the steam valves 35 and it has been found that the appropriate quantity of steam for cooking various kinds of fruits also supplies the desired proportion of water to the compound, but of course if found necessary, additional water may be added and means such as a pipe provided for that purpose.

The peculiarities and advantages of this cooking process are explained in my prior application referred to above and a more detailed description thereof herein appears unnecessary, further than to point out that the fruit particles are not broken up during the cooking operation, thus preventing as far as possible the formation of a thick, heat resisting fluid, but on the contrary, the whole mixture is thoroughly and uniformly heated and cooked. The compound, after being thoroughly cooked, is discharged by propeller 36 to the working or beating elements or plates 46 and thus advanced past the latter by the action of the propeller and inclination of the chamber into the path of scoops 47 which deliver it to the troughs 48 and 49 for subsequent disposal. The sugar receptacle is, as stated, preferably located at the end of the machine remote from the heating chamber so that the sugar is not unfavorably affected by the steam. The construction of the machine is generally such as to eliminate the danger of expansion or swelling and the binding or sticking of the moving parts under the influence of the heat and moisture.

The machine is simple, practical and efficient in character and manipulates the material in an automatic and rapid manner by a continuous form of process which is not only economical but susceptible of accurate control to produce a product of uniform quality and clean and sanitary condition. One operator can supervise the operation of a number of such machines, whereas the quantity of output of any of these machines requires the labor of a number of workers when the operations are performed by hand, and such hand labor is not only of a disagreeable character, but frequently attended by burns and scalding from the heated apparatus and contents. The automatic and continuous form of operation furthermore eliminates considerable wastage of materials due to spilling, improper mixing of ingredients and improper cooking, and the various features facilitating control of the operations afford a product of uniformly pleasing characteristics.

I claim as my invention:

1. A machine for preparing food compounds comprising a plurality of receptacles for the ingredients, propelling means for discharging an ingredient from one of said receptacles to another at a predetermined rate to thereby measure and mix the same, a chamber arranged to receive the mixed ingredients from the final receptacle, means for advancing the mixture through said chamber, and heating means for cooking the mixture during its passage through the latter.

2. A machine for preparing food compounds comprising a plurality of communicating receptacles for the ingredients, propelling means adjacent the bottom of said receptacles operating to discharge an ingredient from one to another thereof at a predetermined rate to thereby measure and mix the same, a chamber arranged to receive the mixed ingredients from the final receptacle, means for advancing the mixture through said chamber, and heating means for cooking the mixture during its passage through the latter.

3. A machine for preparing food compounds comprising a plurality of receptacles each having a discharge outlet, propelling means in said receptacles for discharging the contents thereof through said outlets, one of said receptacles having its outlet leading to the propelling means of the adjacent receptacle, actuating means for driving said propelling means at predetermined speeds to thereby measure and mix the ingredients, a chamber arranged to receive the mixture from the final receptacle, means for advancing the mixture through said chamber, and heating means for cooking the mixture during its passage through the latter.

4. A machine for preparing food compounds comprising a plurality of receptacles each having a discharge outlet, propelling means in one of said receptacles for discharging the contents thereof through said outlet, propelling means in said other receptacle for discharging the contents thereof through said outlet and having a portion thereof extended to receive the discharge from said first receptacle, a chamber arranged to receive ingredients discharged from said other receptacle, propelling means for advancing the ingredients through said chamber, heating means in the latter for cooking the ingredients and actuating means for driving all of said propelling means to measure, mix and advance the ingredients through the machine.

5. A machine for preparing food compounds comprising a plurality of receptacles each having a discharge outlet, propelling means in one of said receptacles for discharging the contents thereof through said outlet, propelling means in another of said receptacles for discharging the contents thereof through said outlet and having a portion extended to receive the discharge from said first receptacle, a chamber arranged to receive the discharge from said other receptacle and provided with means to heat and cook the ingredients, and actuating means for driving the propelling means of said receptacles at different speeds to measure and mix the ingredients.

6. A machine for preparing food compounds comprising a plurality of receptacles each having a discharge outlet, a screw propeller in each of said receptacles for discharging the contents thereof through said outlets, one of said receptacles being arranged to discharge its contents to the propeller of the other receptacle, a chamber provided with heating means arranged to receive the discharge from said other receptacle, and actuating means for rotating said propellers and thereby measuring, mixing and advancing the ingredients through the machine.

7. A machine for preparing food compounds comprising a plurality of receptacles each having a discharge outlet and a screw propeller therein for discharging the contents thereof through said outlet, the propeller of one of said receptacles being extended opposite its discharge end exteriorly of the receptacle to receive the discharged contents of the other receptacle, a chamber provided with means for receiving at one end the ingredients discharged from the final receptacle and discharging the same at its opposite end and with means for heating the same during movement through the chamber, and actuating means for rotating said propellers at predetermined relative speeds to measure and mix the ingredients and advance the same through the machine.

WILLIAM A. SMITH.